(12) United States Patent
Maguin

(10) Patent No.: US 10,513,959 B2
(45) Date of Patent: Dec. 24, 2019

(54) DEVICE FOR PROVIDING A LIQUID ADDITIVE

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 63 days.

(21) Appl. No.: 15/621,429

(22) Filed: Jun. 13, 2017

(65) Prior Publication Data

US 2017/0284261 A1    Oct. 5, 2017

Related U.S. Application Data

(63) Continuation of application No. PCT/EP2015/079575, filed on Dec. 14, 2015.

(30) Foreign Application Priority Data

Dec. 16, 2014   (DE) .................. 10 2014 118 720

(51) Int. Cl.
*F01N 3/20* (2006.01)
*F01N 3/28* (2006.01)

(52) U.S. Cl.
CPC ......... *F01N 3/2066* (2013.01); *F01N 3/2807* (2013.01); *F01N 3/2896* (2013.01); *F01N 2530/06* (2013.01); *F01N 2530/18* (2013.01); *F01N 2610/02* (2013.01); *F01N 2610/1406* (2013.01); *F01N 2610/1486* (2013.01); *Y02A 50/2325* (2018.01); *Y02T 10/24* (2013.01)

(58) Field of Classification Search
CPC .... F01N 3/2066; F01N 3/2807; F01N 3/2896; F01N 2530/06; F01N 2530/253; F01N 2530/18; F01N 2610/02; F01N 2610/1406; F01N 2610/1486; Y02A 50/2325; Y02T 10/24
See application file for complete search history.

(56) References Cited

U.S. PATENT DOCUMENTS

2013/0263941 A1* 10/2013 Landes ................ F01N 3/2066
                                                            137/351

FOREIGN PATENT DOCUMENTS

| AT | 010685 U1 | 8/2009 | |
|----|-----------|--------|---|
| DE | 102006054208 A1 | 7/2007 | |
| DE | 102008044001 A1 | 5/2010 | |
| DE | 102009047647 A1 * | 6/2011 | .............. H05B 3/22 |
| DE | 102010004614 A1 | 7/2011 | |
| DE | 102011084962 A1 * | 4/2013 | ........... F01N 3/2066 |
| DE | 102011084962 A1 | 4/2013 | |

(Continued)

OTHER PUBLICATIONS

International Search Report and Written Opinion dated Feb. 10, 2016 from corresponding International Patent Application No. PCT/EP2015/079575.

(Continued)

*Primary Examiner* — Audrey K Bradley

(57) ABSTRACT

A device for providing a liquid additive, including at least one metallic insert, which is coated, at least in sections, with a plastic coating made of polyethylene (PE). At least one plastic structure made of a high-density polyethylene (HD-PE) or polypropylene (PP) is sprayed onto the plastic coating.

14 Claims, 2 Drawing Sheets

(56) References Cited

FOREIGN PATENT DOCUMENTS

DE  202014103956 U1  9/2014
WO  2012069396 A1  5/2012

OTHER PUBLICATIONS

German Search Report dated Aug. 4, 2015 for corresponding German application No. 10 2014 118 720.2.

* cited by examiner

DEVICE FOR PROVIDING A LIQUID ADDITIVE

CROSS-REFERENCE TO RELATED APPLICATIONS

This application claims the benefit of PCT Application PCT/EP2015/079575, filed Dec. 14, 2015, which claims priority to German Application DE 10 2014 118 720.2, filed Dec. 16, 2014. The disclosures of the above applications are incorporated herein by reference.

FIELD OF THE INVENTION

The invention relates to a device for supplying a liquid additive, which device is in particular suitable for supplying a liquid additive for exhaust-gas purification for an exhaust-gas treatment device.

BACKGROUND OF THE INVENTION

Exhaust-gas treatment devices in which use is made of a liquid additive for exhaust-gas purification are generally used in motor vehicles to reduce nitrogen oxide compounds in the exhaust gas of an internal combustion engine. In exhaust-gas treatment devices of this type, the method of selective catalytic reduction (SCR) is implemented. In the SCR method, nitrogen oxide compounds in the exhaust gas of the internal combustion engine are reduced with the aid of ammonia. Ammonia is commonly stored in motor vehicles not directly but rather in the form of a liquid additive which is converted into ammonia outside the exhaust gas (in a reactor provided especially for this purpose outside the exhaust-gas treatment device) or within the exhaust gas (within the exhaust-gas treatment device).

Urea-water solution is particularly commonly used as liquid additive for exhaust-gas purification. A urea-water solution with a urea content of 32.5% is available for example under the trade name AdBlue®.

A problem with the provision of such liquid additive is that the liquid additive can freeze at low temperatures. The described urea-water solution with a urea content of 32.5%, for example, freezes at −11° C. A further problem is that the exhaust-gas treatment device must normally be supplied with liquid additives even at cold temperatures in order to ensure adequate purification of the exhaust gases of an internal combustion engine. For these purposes, it is known to provide heaters in and/or on a tank for storing liquid additive. A further problem is that liquid additives of this type are very aggressive and not every tank, and not every delivery unit, is suitable for the delivery and supply of such liquid additive.

SUMMARY OF THE INVENTION

It is an object of the present invention to solve, or at least lessen, the technical problems described. It is sought in particular to describe a particularly advantageous device for supplying a liquid additive for exhaust-gas purification, which device permits effective heating of the liquid additive, and which device is particularly resistant to the liquid additive.

The above object is achieved by means of a device according to the features of the claims. Further advantageous refinements of the device are specified in the dependent patent claims. It should be pointed out that the features specified individually in the dependent patent claims may be combined with one another in any desired technologically meaningful way and highlight further embodiments of the invention. The description, in particular in conjunction with the figures, explains the invention further and specifies additional exemplary embodiments of the invention.

It is sought to describe a device for supplying a liquid additive, having at least one metallic insert, which is coated at least in sections with a plastics coating composed of polyethylene (PE), wherein at least one plastics structure composed of high-density polyethylene (HD-PE) or polypropylene (PP) is injection moulded onto the plastics coating.

The metallic insert is preferably a metallic insert for a tank for liquid additive. The metallic insert may however also be any other part of a device for supplying a liquid additive.

Metallic inserts or housings for devices for supplying liquid additive have proven to be particularly advantageous, because metal generally exhibits relatively high thermal conductivity. It has already been explained further above that heaters are generally particularly important for tanks for liquid additive and in devices for supplying liquid additive. Inserts composed of metal permit effective distribution of the heat generated by a heater. By contrast, plastics are particularly resistant to liquid additive. Plastics are therefore particularly suitable for tanks for liquid additive. Furthermore, plastics structures are often be produced at particularly low cost and in a simple manner, in particular if highly complex tank geometries are required in order for tanks to be adapted to the installation space available in a motor vehicle. Tanks composed of plastic may be produced for example by way of injection moulding processes.

The permanent and fluid-tight connection of metal and plastic has however always posed a problem in the case of devices for supplying liquid additive. Experiments have shown that, in particular owing to the different coefficients of thermal expansion of metal and plastic, it is often only possible for relatively small components composed of metal to be inserted in fluid-tight fashion into a tank wall composed of plastic. This appears to be the case because the absolute thermal expansions that occur are then not as great. However, the liquid leak-tightness of such connections should at least theoretically be independent of size. A tank wall composed of plastic will normally eventually become detached from relatively large components composed of metal. This occurs in particular owing to regularly repeating heating and cooling processes of the tank wall and of the component. Such repeated heating generates an air gap between metal and plastic, which gap significantly reduces the thermal conductivity of the contact between metal and plastic. A thermal conductivity of 0.4 to 0.5 W/mK [watts per meter and Kelvin] may be reduced to less than 0.025 W/mK. Such a drop in thermal conductivity further increases the difference in thermal expansion between metal and plastic, such that the destruction of the connection between metal and plastic is further intensified.

This problem is solved by means of the concept described here, specifically that of coating a metallic insert with a plastics coating composed of polyethylene (PE), and then injection moulding plastics structures onto the plastics coating. This technique permits permanent connections of plastic and metal in a device for supplying liquid additive, which connections durably withstand even large deviations between the thermal expansions of plastic and metal, without an air gap being formed between plastic and metal.

As polyethylene, use may be made, for example, of DuPont™Abcite®. Abcite® is a thermoplastic coating powder which ensures a very high level of anti-corrosion protection and UV protection for metals. Abcite® furthermore exhibits high impact strength, and is deformable in broad ranges. In particular, Abcite continues to exhibit high impact resistance even at low temperatures. For example, Abcite exhibits an impact resistance of 760 kJ/m$^2$ [kilojoules per square centimetre] at 23° C., and still exhibits an impact resistance of 640 kJ/m$^2$ at −40° C. Furthermore, the positive characteristics of Abcite® are available in a large temperature range from −100° C. to approximately 80° C.

Furthermore, Abcite® has a high tensile strength and exhibits relatively little thermal expansion.

The plastics coating is particularly preferably polarized from polyethylene. Polarization of the plastics coating may for example be achieved by virtue of the plastics coating being exposed to an electric field during the production process.

The plastics structure may be composed of high-density polyethylene [HD-PE] or of polypropylene [PP]. However, HD-PE is the preferred material for the plastics structure.

High density polyethylene [HD-PE] exhibits particularly high strength. It is characterized by sparsely branched polymer chains and therefore has a high density. The orientation of the polymer chains in HD-PE is relatively uniform. Therefore, a high mass fraction of HD-PE is crystalline. The yield strength of HD-PE is normally higher than 20 N/mm$^2$ [newtons per square millimetre], and the elongation at the yield point is approximately 12%. The density is normally greater than 0.94 g/cm$^3$ [grams per cubic centimetre]. The modulus of elasticity at room temperature is over 800 N/mm$^2$. HD-PE exhibits high chemical resistance to oxidants, in particular at temperatures such as normally arise in a tank for a liquid additive for exhaust-gas purification.

Polypropylene [PP] is also a plastics material. It has been found that it has similar characteristics to HD-PE if used for structures which are produced using injection moulding methods and which are applied to plastics coatings composed of polarized polyethylene [PE].

The polyethylene is characterized in particular in that it differs from the high-density polyethylene of the plastics structure. In particular, in relation to the high-density polyethylene of the plastics structure, polyethylene exhibits lower strength, lower density, a lower modulus of elasticity and increased flexibility.

Owing to the coating of (polarized) polyethylene or Abcite®, a flexible transition layer is produced between the metallic material of the at least one insert and the plastic of the plastics structure. In particular, the coating is capable of transmitting relatively large forces between the metallic insert and the plastics structure, and simultaneously forms an intermediate layer which mediates between the thermal expansion of the plastics material and the thermal expansion of the metallic material. A permanent connection of the metallic insert and the plastics structure is thus ensured.

Both the coating composed of (polarized) polyethylene or Abcite® and the plastics structure composed of high-density polymer are resistant to liquid additive for exhaust-gas purification, and in particular to urea-water solution.

The plastics structure is injection-moulded onto the plastics coating by means of an injection-moulding process. This means in particular that the plastics coating is insert-moulded. The plastics coating may be completely, partially or even only locally insert-moulded.

The device is furthermore advantageous if the at least one metallic insert is a housing for a delivery unit for liquid additive, and the plastics structure forms at least one section of a tank wall.

A delivery unit for liquid additive having a metallic housing is particularly advantageous because a heater for heating the liquid additive may also be arranged on the delivery unit, and the heat from the heater is conducted from the housing to the outside in an effective manner. This is advantageous in particular if the housing with the delivery unit is integrated into a tank for a liquid additive. It is then possible for the heat from the heater in the delivery unit to pass directly into the interior of the tank and thus into the liquid additive.

If a housing is incorporated, as a metallic insert, into a tank wall, there are often particularly large connecting surfaces between the metallic insert and the tank wall. The particularly large connecting surfaces must be sealed off. Owing to thermal expansions of the tank wall and of the insert, it is generally important here to produce a particularly secure connection between metal and plastic, because otherwise, the metal and plastic would become detached from one another as a result of thermal expansions. This generates an air gap between metal and plastic and a significant reduction of the thermal conductivity between metal and plastic, as has already been discussed further above. It has been found that, through the described use of a plastics coating composed of polarized ethylene, these demands may be met, and also, an adequately secure connection between metal and plastic is ensured, which connection is adequate even in the presence of very large sealing surfaces, such as in the case of a housing. A housing for a delivery unit preferably has a diameter of greater than 100 mm, particular preferably of between 120 and 200 mm.

The device is furthermore advantageous if the at least one metallic insert is an inlay, and the plastics structure forms a housing for a delivery unit, into which housing the inlay is injection moulded.

For delivery units for liquid additive, it is often also advantageous to use housings composed of plastic which form a plastics structure. For the housing, plastic is the preferred material in particular if it is sought to provide complex housing geometries. However, in the case of housings composed of plastic, it is generally a problem that adequate thermal conductivity from the tank into the housing, and/or from the housing into the tank, is not ensured. For this reason, it is advantageous for metallic inserts or metallic inlays to be introduced into a housing of this type, which metallic inserts or inlays improve the thermal conductivity through the housing.

Such inlays are likewise of particularly large-area form, and therefore a particularly secure connection is required between the plastic and metal, which connection may be provided in a particularly effective manner for example by way of the described plastics coating composed of polyethylene.

The device is furthermore advantageous if the at least one metallic insert is connected in heat-conducting fashion to a heating element.

It is particularly preferable for a heating element to be in direct thermal contact with the metallic insert. It is thus possible for the heat of the heating element to be transmitted to the metallic insert in a particularly effective manner. A heating element may for example be a PTC [positive temperature coefficient] heating element or any other desired electric resistance heating element. It is however also possible for the heating element to be a line for a heating liquid or any desired other electrically operated heater or a resistance heater.

The device is furthermore advantageous if the at least one metallic insert extends at least in sections through a tank wall formed by the plastics structure.

By means of the described connection between metal and plastic, it is even possible for metal structures to be incorporated in fluid-tight fashion into a tank wall, which metal structures make it possible to realize a thermal bridge from the inside of the tank to the outside. It is possible for a plastics coating to be applied to the metallic insert only in sections, wherein it is then the case that a connection to a plastics structure or to the tank wall is actually realized only at the sections with the plastics coating, and other regions do not have a plastics coating composed of polyethylene. It is however also possible for a metallic insert or a metallic structure that extends through the tank wall to be coated entirely with a coating composed of polyethylene. Such a complete coating firstly protects the material of the metallic insert, and secondly, such a coating is often very much easier to apply to the metallic insert than a coating provided only in sections. Such a complete coating has the positive side effect of providing electrical insulation between the metal structure and the liquid additive.

The device is furthermore advantageous if the at least one metallic insert is a bell cover which surrounds, at least in regions, a housing, formed by a plastics structure, for a delivery unit.

A bell cover of this type is expedient in particular in the case of a delivery unit, having a housing, which is inserted into a tank base of a tank for liquid additive. In the case of a delivery unit of this type, there is normally only a relatively limited surface area of the delivery unit available for the transmission of heat from the delivery unit into the liquid additive in the tank. The surface area may be enlarged considerably by way of a bell cover arranged on the outside around the delivery unit. Furthermore, the additional volume taken up in a tank by a bell cover of this type is relatively small. In particular, a bell cover may be introduced in a very simple manner through an opening in the tank (together with the delivery unit). Between the bell cover and the housing of the delivery unit, there is preferably a gap through which the liquid additive may be drawn in by the delivery unit.

A bell cover of this type may have a section that extends through the housing and/or through the tank wall. A connection of the bell cover and of the housing is preferably formed in the section, wherein, in the case of the connection, the bell cover forms the metallic insert and the housing forms the plastics structure. The section extends through the wall of the housing. To form the connection, the coating composed of polyethylene is applied to the stated section of the bell cover.

The bell cover, as metallic insert, is particularly preferably combined with a heater within the housing of the delivery unit. The bell cover then forms a very large metallic surface via which heat may be emitted by the heater within the tank. In one design variant, a bell cover may be of closed design, such that a gap through which reducing agent is drawn into an intermediate space between the bell cover and the housing when the delivery unit is imparting a delivery action is provided only in a lower region, in the vicinity of a base of a reducing agent tank. In further design variants, the bell cover may also be of slotted or perforated form so as to serve substantially only for heat distribution in the tank and so as to have no direct effect on the flow paths during the withdrawal of liquid from the tank.

The device is furthermore advantageous if the plastics coating has a coating thickness of between 50 μm [micrometres] and 500 μm [micrometres] or even of up to 1500 μm [micrometres].

The coating thickness preferably increases with increasing overall size of those surface areas of the metallic insert which are connected to the tank wall. The thicker the coating, the greater the effectiveness with which the coating may compensate for different thermal expansions between the metallic insert and the plastics structure. It has been found that coating thicknesses from 50 μm to 500 μm may firstly be produced sufficiently accurately and easily, and secondly permit adequate compensation of different thermal expansions between the metallic structure of the insert and the plastics structure.

The device is furthermore advantageous if the at least one metallic insert is composed of aluminium.

Aluminium exhibits particularly high thermal conductivity, and the described plastics coating composed of polyethylene exhibits particularly secure hold on aluminium. A polarization of the coating increases yet further the durability of the connection between the aluminium and the coating.

It is also the intention here to describe a motor vehicle having an internal combustion engine and having an exhaust-gas treatment device with an SCR catalytic converter for the purification of the exhaust gases of the internal combustion engine and with a described device for supplying liquid additive for the exhaust-gas treatment device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention and the technical field will be explained in more detail below on the basis of the figures. The figures show particularly preferred exemplary embodiments of the invention, to which the invention is however not restricted. It is pointed out in particular that the figures, and in particular the dimensional relationships illustrated in the figures, are merely schematic. The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
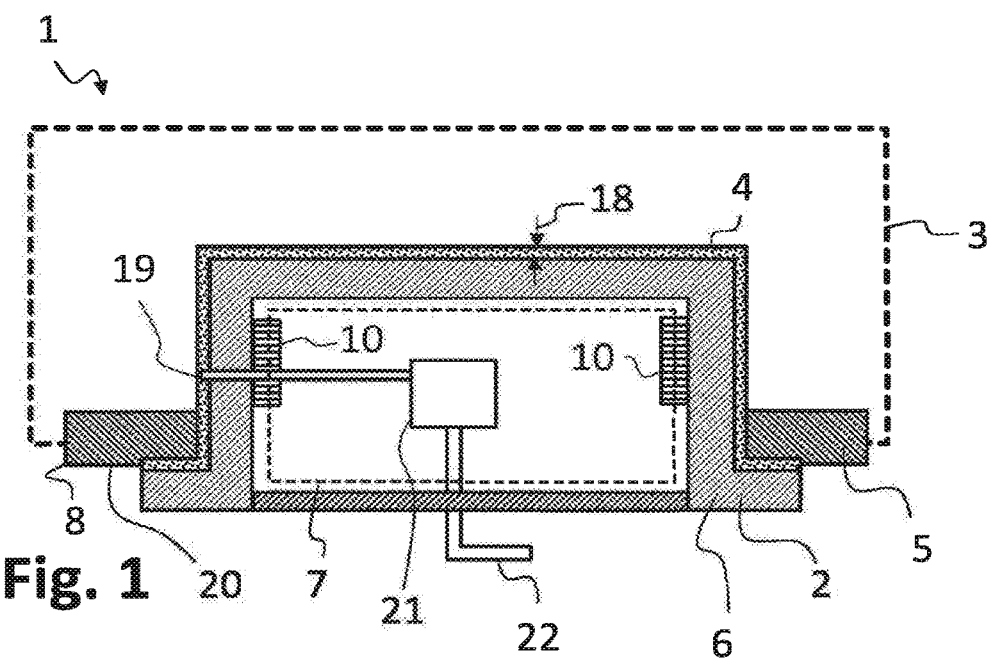
FIG. 1 is a diagram of a first embodiment of a device for supplying a liquid additive, according to embodiments of the present invention.
Figure 2:
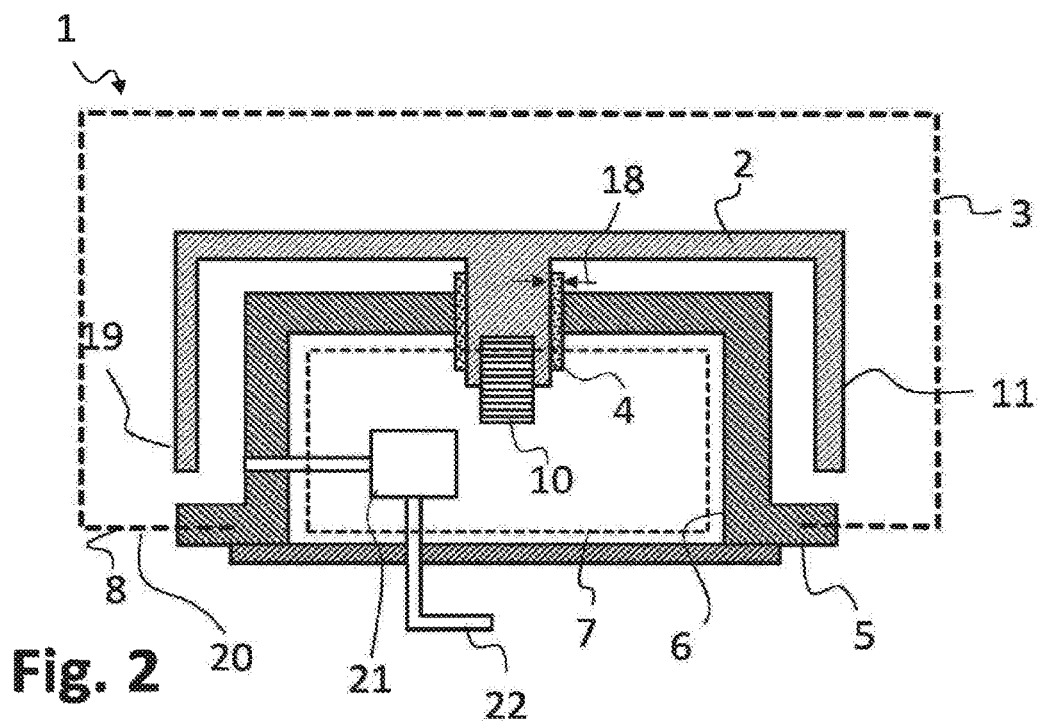
FIG. 2 is a diagram of a second embodiment of a device for supplying a liquid additive, according to embodiments of the present invention.
Figure 3:
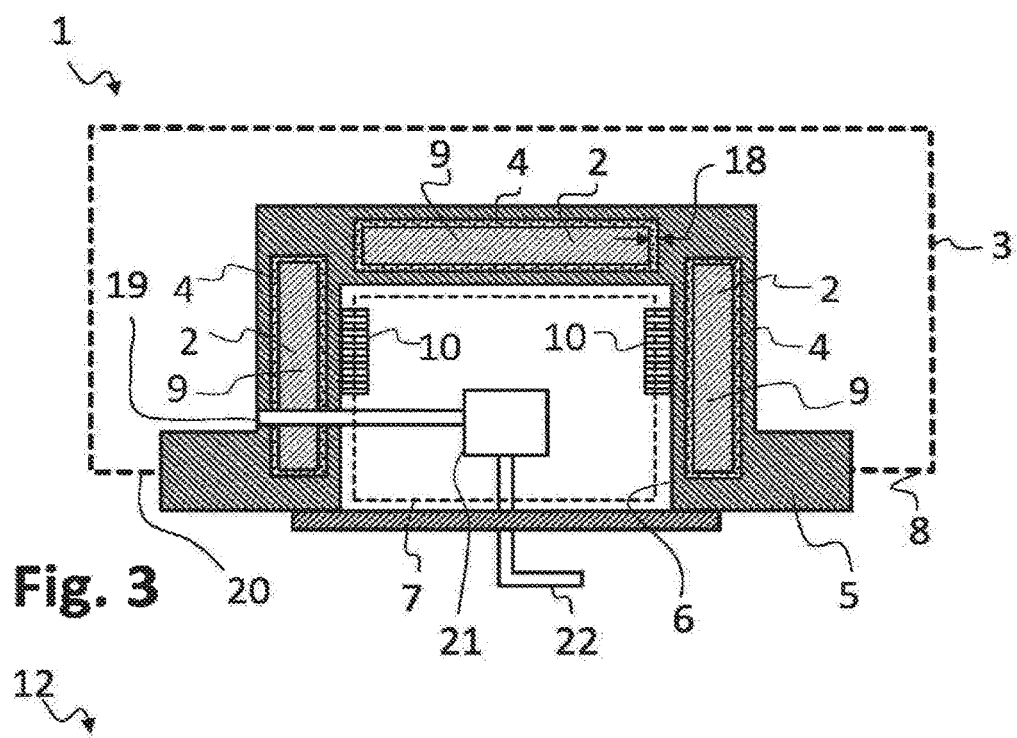
FIG. 3 is a diagram of a third embodiment of a device for supplying a liquid additive, according to embodiments of the present invention.

Here, the identical features of FIGS. 1, 2 and 3 will firstly be explained jointly. FIGS. 1, 2 and 3 each show a device 1 for supplying liquid additive, having a tank 3 in which the liquid additive is stored and which has a tank wall 8 composed of plastic.

In FIG. 1, the tank wall 8 composed of plastic forms a plastics structure 5. A metallic insert 2 is inserted into an opening in the tank base 20 of the plastics structure 5, which metallic insert forms a housing 6 for accommodating a delivery unit 7. The housing 6, which constitutes the metallic insert, has a plastics coating 4 onto which the tank wall 8, as plastics structure 5, is injection moulded. The delivery unit 7 in the housing 6 has a pump 21 by means of which liquid additive may be withdrawn from the tank 3 at an intake point 19 and supplied at a supply port 22. In the housing 6 there are situated heating elements 10 by means of which liquid in the tank 3 may be heated.

In FIG. 2, the housing 6 of the delivery unit 7 is composed of plastic, and the metallic insert 2 is formed by a bell cover 11 which extends around the housing 6, wherein the bell cover 11 has a section which has a plastics coating 4 and which extends through the housing 6. It is also the case in FIG. 2 that the housing 6 is situated on the tank base 20. Here, the housing 6 forms the plastics structure 5 which is injection moulded onto the metallic insert 2 or onto the plastics coating 4 on the metallic insert 2. In direct contact with the bell cover 11, there is a heating element 10 for heating liquid in the tank 3 via the bell cover 11. Here, the delivery unit 7 in the housing 6 is designed correspondingly to that in FIG. 1.

FIG. 3 shows a situation in which the housing 6 of the delivery unit 7 forms the plastics structure 5 into which inlays 9 are embedded as metallic inserts 2, wherein the metallic inserts 2 or inlays 9 each have a plastics coating 4 onto which the housing 6, as plastics structure 5, is injection moulded. It is also the case in FIG. 3 that the housing 6 is situated on the tank base. Here, too, heating elements 10 are provided within the housing 6, by means of which heating elements liquid in the tank 3 may be heated through the housing 6. Here, the delivery unit 7 in the housing 6 is designed correspondingly to that in FIG. 1.

Figure 4:
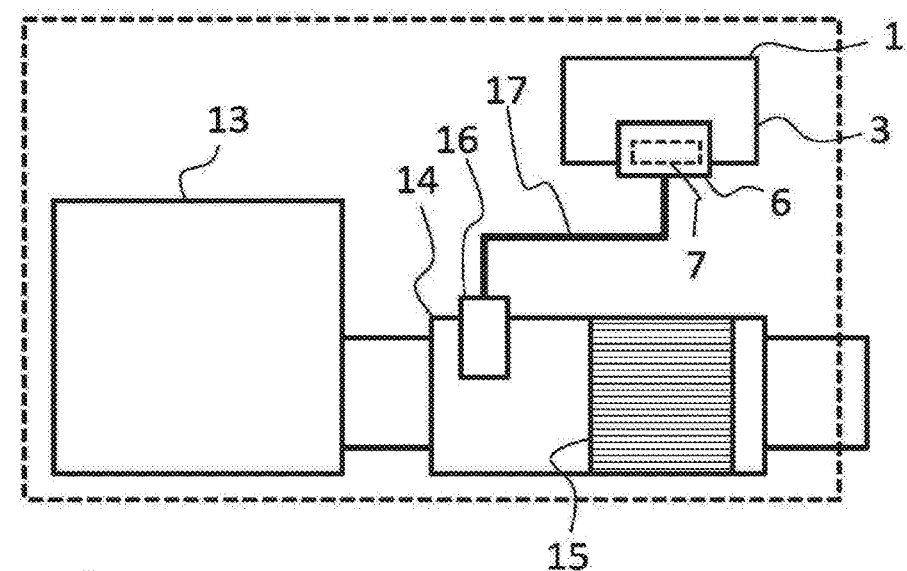
FIG. 4 is a diagram of a motor vehicle having a device for supplying a liquid additive, according to embodiments of the present invention.

FIG. 4 shows a motor vehicle 12 having an internal combustion engine 13 and having an exhaust-gas treatment device 14 with an SCR catalytic converter 15 for the purification of the exhaust gases of the internal combustion engine 13. Liquid additive for carrying out the SCR method in the SCR catalytic converter 15 is supplied to the exhaust-gas treatment device 14 by an injector 16, wherein the injector 16 is in turn supplied with liquid additive, via a line 17, from a device 1 with a tank 3. For this purpose, the device 1 also has a housing 6 and a delivery unit 7, which are inserted into the tank 3 of the device 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for supplying a liquid additive, comprising:
    a delivery unit for supplying liquid additive;
    a plastics coating;
    at least one metallic insert completely coated with the plastics coating;
    a housing, the at least one metallic insert forming at least a part of the housing;
    at least one plastics structure injection moulded onto the plastics coating such that the plastics coating is surrounded by the at least one plastics structure; and
    a tank wall, the at least one plastics structure forming at least a portion of the tank wall;
    wherein the delivery unit for liquid additive is located in the housing.

2. The device for supplying a liquid additive of claim 1, further comprising a heating element, wherein the at least one metallic insert is connected to the heating element in heat-conducting fashion.

3. The device for supplying a liquid additive of claim 1, the plastics coating further comprising a coating thickness between 50 µm and 500 µm.

4. The device for supplying a liquid additive of claim 1, wherein the at least one metallic insert is composed of aluminium.

5. The device for supplying a liquid additive according to claim 1, wherein the plastics coating is composed of polyethylene (PE).

6. The device for supplying a liquid additive according to claim 1, the at least one plastics structure being made of a material selected from the group consisting of high-density polyethylene (HD-PE) and polypropylene (PP).

7. The device for supplying a liquid additive according to claim 1, wherein the device for supplying liquid additive is used with an exhaust-gas treatment device having an SCR catalytic converter, and the SCR catalytic converter is used for the purification of exhaust gases of an internal combustion engine.

8. A device for supplying a liquid additive, comprising:
    a plastics coating;
    at least one inlay completely coated with the plastics coating;
    at least one plastics structure moulded onto the plastics coating such that the plastics coating is surrounded by the at least one plastics structure;
    a housing, the at least one plastics structure forming at least a portion of the housing;
    a delivery unit for supplying liquid additive, the delivery unit for liquid additive being located in the housing;
    a tank wall, the at least one plastics structure forming at least a portion of the tank wall;
    wherein the housing is injection moulded around the plastics coating.

9. The device for supplying a liquid additive of claim 8, the at least one inlay further comprising at least one metallic insert.

10. The device for supplying a liquid additive of claim 9, wherein the at least one metallic insert is composed of aluminium.

11. The device for supplying a liquid additive of claim 8, the plastics coating further comprising a coating thickness between 50 µm and 500 µm.

12. The device for supplying a liquid additive according to claim 8, wherein the plastics coating is composed of polyethylene (PE).

13. The device for supplying a liquid additive according to claim 8, the at least one plastics structure being made of a material selected from the group consisting of high-density polyethylene (HD-PE) and polypropylene (PP).

14. The device for supplying a liquid additive according to claim 8, wherein the device for supplying liquid additive is used with an exhaust-gas treatment device having an SCR catalytic converter, and the SCR catalytic converter is used for the purification of exhaust gases of an internal combustion engine.

* * * * *